(12) United States Patent
Rochan Meganathan et al.

(10) Patent No.: US 10,671,862 B2
(45) Date of Patent: Jun. 2, 2020

(54) METHOD AND SYSTEM FOR DETECTING OBSTACLES BY AUTONOMOUS VEHICLES IN REAL-TIME

(71) Applicant: WIPRO LIMITED, Bangalore (IN)

(72) Inventors: Ranjith Rochan Meganathan, Ooty (IN); Sujatha Jagannath, Bangalore (IN)

(73) Assignee: Wipro Limited, Bangalore (IN)

( * ) Notice: Subject to any disclaimer, the term of this patent is extended or adjusted under 35 U.S.C. 154(b) by 98 days.

(21) Appl. No.: 15/923,006

(22) Filed: Mar. 16, 2018

(65) Prior Publication Data
US 2019/0236381 A1 Aug. 1, 2019

(30) Foreign Application Priority Data
Jan. 30, 2018 (IN) .............................. 201841003468

(51) Int. Cl.
*G01S 17/89* (2020.01)
*G06T 7/00* (2017.01)
*G01S 17/86* (2020.01)
*G01S 17/931* (2020.01)
*G06T 7/70* (2017.01)
(Continued)

(52) U.S. Cl.
CPC ........ *G06K 9/00805* (2013.01); *G01S 7/4808* (2013.01); *G01S 17/86* (2020.01);
(Continued)

(58) Field of Classification Search
CPC ........... G06K 9/00805; G06K 9/00798; G06K 9/00791; G06K 9/00812; G06K 9/00201; G06K 9/00208; G06T 7/97
(Continued)

(56) References Cited

U.S. PATENT DOCUMENTS 9,335,766 B1 5/2016 Silver et al.
9,360,554 B2 6/2016 Retterath et al.
(Continued)

FOREIGN PATENT DOCUMENTS

CN 102103202 6/2011
WO WO 2006/027339 3/2006

OTHER PUBLICATIONS

Extended European Search Report issued in the European Patent Office in counterpart European Application No. 18164016.0, dated Sep. 24, 2018, 6 pages.
(Continued)

*Primary Examiner* — Dwayne D Bost
*Assistant Examiner* — Stephen M Brinich
(74) *Attorney, Agent, or Firm* — Finnegan, Henderson, Farabow, Garrett & Dunner, LLP

(57) ABSTRACT

The present disclosure relates to detection of obstacles by an autonomous vehicle in real-time. An obstacle detection system of an autonomous vehicle obtains point cloud data from single frame Light Detection and Ranging (LIDAR) data and camera data, of the surroundings of the vehicle. Further, the system processes the camera data to identify and extract regions comprising the obstacles. Further, the system extracts point cloud data corresponding to the obstacles and enhances the point cloud data, with the detailed information of the obstacles provided by the camera data. Further, the system processes the enhanced point cloud data to determine the obstacles along with the structure and orientation of obstacles. Upon determining the details of the obstacles, the system provides instructions to the vehicle to manoeuvre the obstacle. The disclosed obstacle detection system provides accurate data about a structure, an orientation and a location of the obstacles.

15 Claims, 11 Drawing Sheets

(51) Int. Cl.
*G06K 9/00* (2006.01)
*G01S 7/48* (2006.01)
*G08G 1/16* (2006.01)
*G06T 7/11* (2017.01)
*G06T 7/90* (2017.01)

(52) U.S. Cl.
CPC ............ *G01S 17/89* (2013.01); *G01S 17/931* (2020.01); *G06K 9/00201* (2013.01); *G06T 7/70* (2017.01); *G06T 7/97* (2017.01); *G08G 1/16* (2013.01); *G06T 7/11* (2017.01); *G06T 7/90* (2017.01); *G06T 2207/10012* (2013.01); *G06T 2207/10028* (2013.01); *G06T 2207/20081* (2013.01); *G06T 2207/30261* (2013.01)

(58) Field of Classification Search
USPC .................... 382/104, 100, 106–107, 199
See application file for complete search history.

(56) References Cited

U.S. PATENT DOCUMENTS

| | | |
|---|---|---|
| 9,521,317 B2 | 12/2016 | Yu et al. |
| 10,005,564 B1* | 6/2018 | Bhatia .................... B64D 45/00 |
| 2012/0307010 A1* | 12/2012 | Evertt .................. H04N 5/2226 348/46 |
| 2017/0104980 A1 | 4/2017 | Tran et al. |
| 2018/0018528 A1 | 1/2018 | Xie et al. |
| 2018/0374238 A1* | 12/2018 | Park .......................... G06T 7/75 |

OTHER PUBLICATIONS

Zhao, G., et al., "Fusion of 3D LIDAR and Camera Data for Scene Parsing", *Journal of Visual Communication and Image Representation*, (2012) pp. 1-55.

* cited by examiner

METHOD AND SYSTEM FOR DETECTING OBSTACLES BY AUTONOMOUS VEHICLES IN REAL-TIME

TECHNICAL FIELD

The present disclosure relates to autonomous vehicles. Particularly, but not exclusively, the present disclosure relates to a method and a system for detecting obstacles around an autonomous vehicle in real-time.

BACKGROUND

An autonomous vehicle (driverless vehicle) uses various sensors to navigate through a path. Also, various techniques are used to detect obstacles in the surroundings of the autonomous vehicle. The autonomous vehicle senses the environment with the help of sensors such as laser, Light Detection and Ranging (LIDAR), computer vision, camera and the like. The autonomous vehicle has a central control unit that helps the autonomous vehicle to traverse a path to reach a destination location from a source location. Also, the central control unit helps the autonomous vehicle to manoeuvre obstacles detected in the path. In few scenarios, when the autonomous vehicle is moving at relatively high speeds, there may be difficulty in detecting the obstacles. In such scenarios the detection of obstacles and the decision of maneuvering the obstacles has to be expedited in order to prevent accidents. Few of the existing autonomous vehicle uses only LIDAR sensors for obstacle detection. Few other existing autonomous vehicle uses camera imaging for obstacle detection. In another scenario, when the obstacles are at a far distance from the autonomous vehicle, the data obtained from the LIDAR sensors may not be accurate, thereby causing difficulty in the detection of obstacles. In the existing autonomous vehicle, when using camera to detect obstacles present around the autonomous vehicle, the control unit undergoes a rigorous training, with various training datasets. Thereby, while processing the images captured by the camera, in real-time, the computation time required to identify the obstacles increases. Thus, the existing autonomous vehicle consumes more time to provide results. The existing autonomous vehicle makes use of several frames of images captured by the camera of the autonomous vehicle. Thus, each of the several frames of images is processed to detect the obstacles, thereby increasing the computation time. Thus, existing autonomous vehicles does not provide an efficient solution to address the above-mentioned problems.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method for detecting obstacles by a vehicle in real-time. The method comprises receiving, by an Electronic Control Unit (ECU) of a vehicle, one or more images of surroundings of the vehicle from an imaging unit and point cloud data of the surroundings of the vehicle from a Light Detection and Ranging (LIDAR) unit. The method further comprise generating a disparity image by analysing the one or more images, extracting one or more regions comprising one or more obstacles, from the disparity image, determining boundary points of each of the one or more obstacles, for determining a position of each of the one or more obstacles in terms of image co-ordinates in the disparity image, extracting point cloud data points from the point cloud data based on the image co-ordinates of the boundary points corresponding to each of the one or more obstacles and determining a gradient for each of the point cloud data points to determine a structural orientation of each of the one or more obstacles, thereby detecting each of the one or more obstacles.

In an embodiment, the present disclosure related to an obstacle detection system for detecting obstacles by a vehicle in real-time. The obstacle detection system comprises an Electronic Control Unit (ECU). The ECU is configured to receive a pair of images of surroundings of the vehicle from an imaging unit and point cloud data of the surroundings of the vehicle from a Light Detection and Ranging (LIDAR) unit. The ECU is further configured to generate a disparity image by analysing the pair of images, extract one or more regions comprising one or more obstacles, from the disparity image, determine boundary points of each of the one or more obstacles, for determining a position of each of the one or more obstacles in terms of image co-ordinates in the disparity image, extract point cloud data points from the point cloud data based on the image co-ordinates of the boundary points corresponding to each of the one or more obstacles and determine a gradient for each of the point cloud data points to determine a structural orientation of each of the one or more obstacles, thereby detecting each of the one or more obstacles.

In an embodiment, the present disclosure relates to a non-transitory computer readable medium including instruction stored thereon that when processed by at least one processor cause an obstacle detection system to receive an application. The instruction may cause the processor to receive one or more images of surroundings of the vehicle from an imaging unit and point cloud data of the surroundings of the vehicle from a Light Detection and Ranging (LIDAR) unit. The instruction may cause the processor to generate a disparity image by analysing the one or more images, extract one or more regions comprising one or more obstacles, from the disparity image, determine boundary points of each of the one or more obstacles, for determining a position of each of the one or more obstacles in terms of image co-ordinates in the disparity image. The instruction may cause the processor to extract point cloud data points from the point cloud data based on the image co-ordinates of the boundary points corresponding to the one or more obstacles and determine a gradient for each of the point cloud data points to determine a structural orientation of the one or more obstacles, thereby detecting the one or more obstacles.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
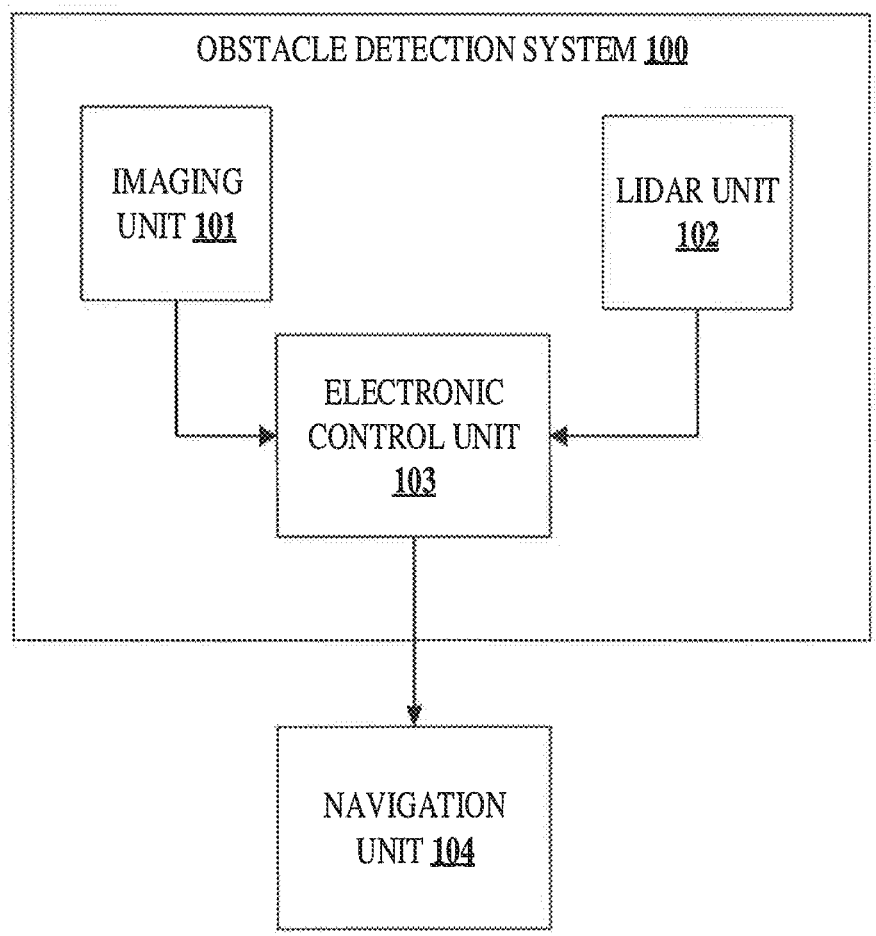
FIG. 1 is illustrative of an exemplary block diagram of an obstacle detection system for detecting obstacles by a vehicle, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to detection of obstacles by an autonomous vehicle in real-time. An obstacle detection system of an autonomous vehicle obtains point cloud data from single frame Light Detection and Ranging (LIDAR) data and camera data, of the surroundings of the vehicle. The point cloud data of the surroundings comprises a plurality of 3-Dimensional (3D) data points defined by corresponding cartesian co-ordinates. Further, the system processes the camera data to identify and extract regions comprising the obstacles. Further, the system extracts point cloud data corresponding to the obstacles and enhances the point cloud data, with the detailed information of the obstacles provided by the camera data. Further, the system processes the enhanced point cloud data to determine the obstacles along with the structure and orientation of obstacles. Upon determining the details of the obstacles, the system provides instructions to the vehicle to manoeuvre the obstacle. The disclosed obstacle detection system provides accurate data about a structure, an orientation and a location of the obstacles.

FIG. 1 is illustrative of an exemplary block diagram of an obstacle detection system 100 for detecting obstacles by a vehicle, in accordance with some embodiments of the present disclosure. The obstacle detection system 100 comprises an imaging unit 101, a LIDAR unit 102, and an Electronic Control Unit (ECU) 103. In an embodiment, the vehicle may be, but not limited to, an autonomous vehicle and semi-autonomous vehicle. The ECU 103 may receive an information regarding the obstacles present in the surroundings of the vehicle from the imaging unit 101 and the LIDAR unit 102. The imaging unit 101 captures one or more images of the surrounding of the vehicle and provides the captured one or more images to the ECU 103 for processing. In an embodiment, let us consider that the imaging unit 101 is a stereo camera. The stereo camera may comprise of two monocular cameras separated by a baseline distance. The baseline distance is the distance between a centre of focus of the two monocular cameras. The stereo camera captures two images, a first image and a second image of the surrounding of the vehicle from two different views. Each of the monocular camera captures an image, thereby constituting a pair of images. The two images are captured at a same time interval, such that each of the monocular camera has a common focus. The two images captured by the stereo camera may be used by the ECU 103 to produce a disparity image. The ECU 103 may map every pixel in the first image, to a corresponding pixel in the second image and compute a disparity value. The disparity value indicates a pixel difference between the two images to produce a disparity image. Each pixel in the disparity image also comprises the disparity value. The disparity image may be used for detecting the one or more obstacles.

In an embodiment, the LIDAR unit 102 comprises a LIDAR sensor. The LIDAR unit 102 produces a LIDAR map comprising elevation of every object in the surrounding of the vehicle. The data related to every object in the surrounding of the vehicle is called as point cloud data. The point cloud data may comprise several point cloud data points with each of the point cloud data points defined by a corresponding 3D cartesian co-ordinate. The point cloud data points may indicate the elevation of every object present in the surroundings of a vehicle. The point cloud data is received by the ECU 103 from the LIDAR unit 102.

The ECU 103 may extract one or more regions comprising the one or more obstacles from the disparity image. In an embodiment, each region of the one or more regions may comprise at least one obstacle. The ECU 103 may further determine boundary points of each of the one or more obstacles present in respective one or more regions. Further, image co-ordinates of the boundary points of each of the one or more obstacles is determined by the ECU 103. The image co-ordinates of the boundary points of each of the one or more obstacles may be converted to 3D co-ordinates. Then, the ECU 103 extracts the point cloud data points corresponding to 3D co-ordinates of the one or more obstacles from the point cloud data. The extracted point cloud data points represent the one or more obstacles present in the one or more regions in the disparity image.

In an embodiment, then the one or more obstacles in the surroundings of the vehicle are present closer to vehicle, the point cloud data points corresponding to the one or more obstacles provide accurate depth information of the one or more obstacles. The depth information defines the 3D data of the point cloud data points corresponding to the one or more obstacles. In an embodiment, the point cloud data points may be densely populated in the LIDAR map when the one or more obstacles are closer the vehicle. When the one or more obstacles are far from the vehicle, the point cloud data points may not be accurate, thereby the one or more obstacles may not be identified easily. For the scenario mentioned above, the one or more images captured by the imaging unit 101 are used to determine the one or more obstacles. The one or more images may comprise a plurality of pixels representing every object in the surrounding. The plurality of pixels may be dense (having pixel wise information on each of the one or more obstacles). Thus, the one or more obstacles may be identified easily.

Further, the ECU 103 determines a structural orientation of each of the one or more obstacles based on the corresponding extracted point cloud data points. Processing the extracted point cloud data points may result in detection of the one or more obstacles present in the surroundings of the vehicle with accurate location, structure and orientation of the one or more obstacles. In an embodiment, the ECU 103 may communicate with a navigation unit 104. The navigation unit 104 receives the information on the location, structure and orientation of each of the one or more obstacles, from the ECU 103 and enables the vehicle to manoeuvre each of the one or more obstacles present in the surroundings of the vehicle.

In an embodiment, the imaging unit 101 may be, but is not limited to, a low-resolution camera, an Infrared (IR) camera, a stereo camera, a Digital Single-Lens Reflex (DSLR) camera and the like. In an embodiment, the stereo camera comprises two monocular cameras. The two monocular cameras are placed on the vehicle such that the two monocular cameras are on a same plane and are parallel to a reference plane, for example the ground. An optical axis of a first monocular camera may be parallel to an optical axis of a second monocular camera.

In an embodiment, the ECU 103 may be integrated with variety of sensors used for sensing the environment and surroundings of the vehicle. Various techniques, employing the variety of sensors may include, but are not limited to, Radio Detection and Ranging (RADAR), odometry, computer vision and the like. The variety of sensors may include, but are not limited to, an ultrasound sensor, a proximity sensor and the like.

Figure 2:
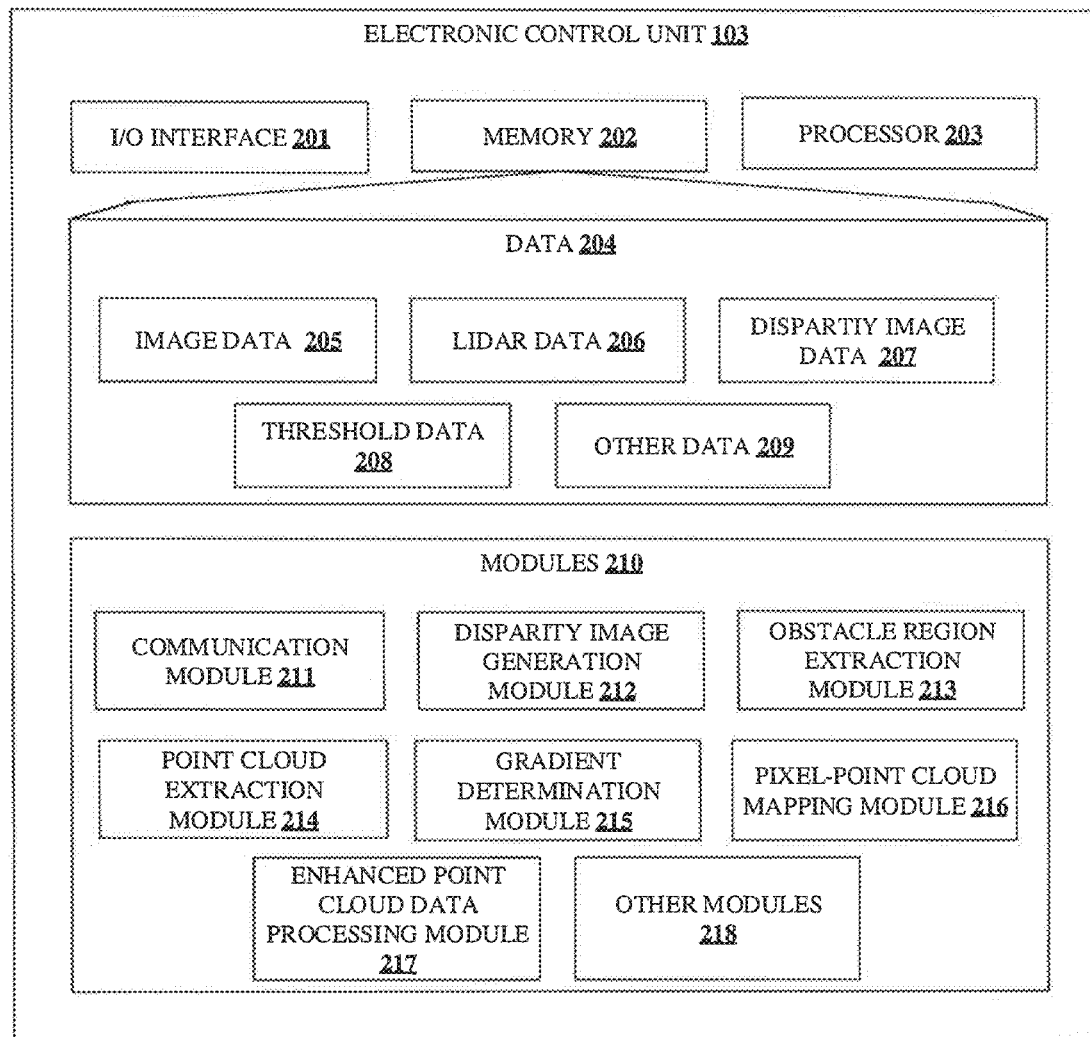
FIG. 2 illustrates a block diagram of internal architecture of an Electronic Control Unit (ECU) configured to detect obstacles in the surrounding of a vehicle, in accordance with some embodiments of the present disclosure.

FIG. 2 illustrates a block diagram of internal architecture of ECU 103 configured to detect obstacles in the surrounding of a vehicle, in accordance with some embodiments of the present disclosure. The ECU 103 may include at least one Central Processing Unit ("CPU" or "processor") 203 and a memory 202 storing instructions executable by the at least one processor 203. The processor 203 may comprise at least one data processor for executing program components for executing user or system-generated requests. The memory 202 is communicatively coupled to the processor 203. The ECU 103 further comprises an Input/Output (I/O) interface 201. The I/O interface 201 is coupled with the processor 203 through which an input signal or/and an output signal is communicated.

In an embodiment, data 204 may be stored within the memory 202. The data 204 may include, for example, image data 205, LIDAR data 206, disparity image data 207, threshold data 208 and other data 209.

In an embodiment, the image data 205 may include, but is not limited to, information on the one or more images captured by the imaging unit 101. The image data 205 may store each of the one or more images captured by the imaging unit 101 in the memory 202.

In an embodiment, the LIDAR data 206 comprises the point cloud data. The point cloud data may comprise several point cloud data points with each of the point cloud data point defined by a corresponding 3D co-ordinate (x, y and z co-ordinate). The point cloud data points may indicate the elevation of every object present in the surroundings of the vehicle.

In an embodiment, the disparity image data 207 may store the disparity image generated by the ECU 103. The disparity image data 207 may also store the image co-ordinates of the boundary points of each of the one or more obstacles extracted from the disparity image.

Figure 3:
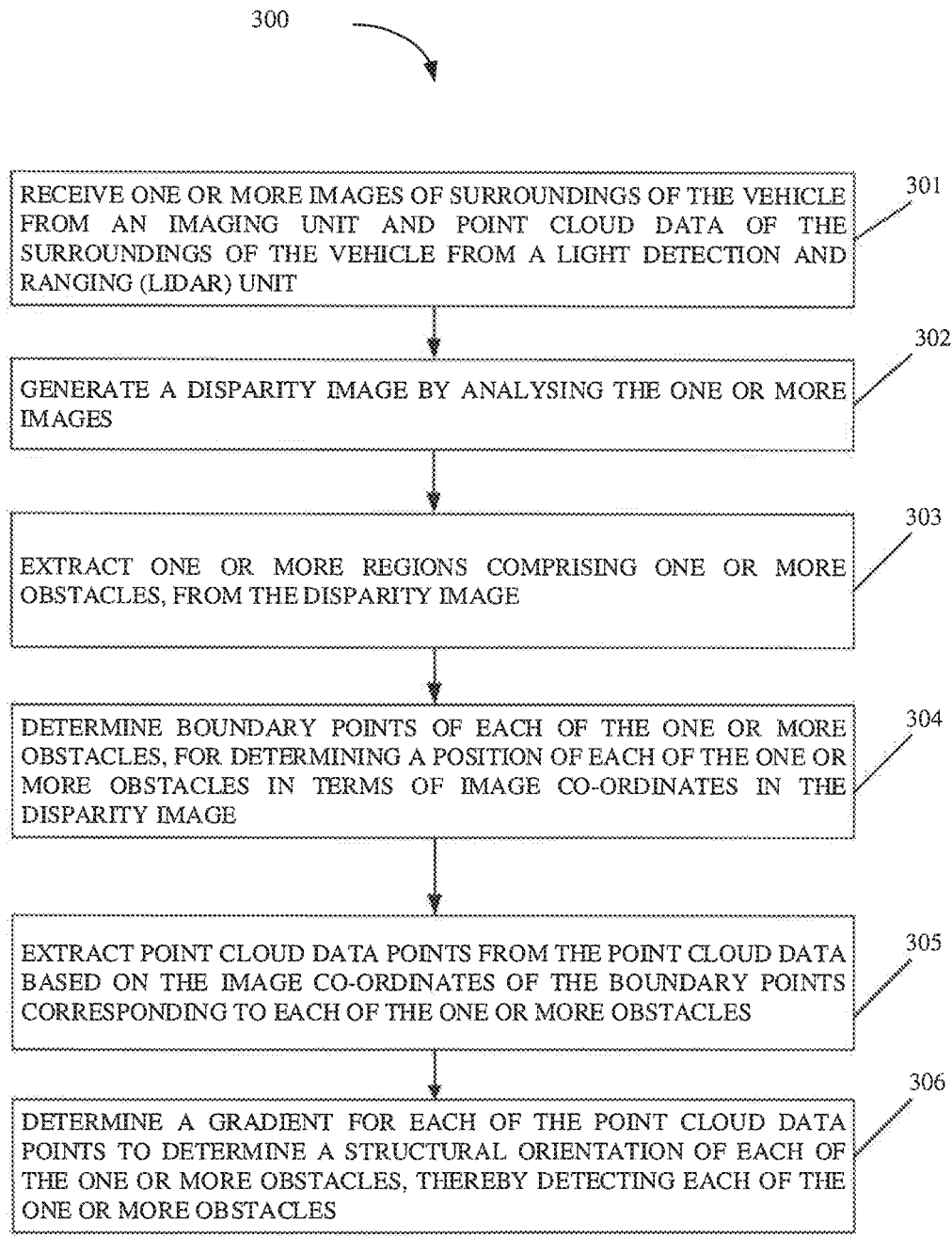
FIG. 3 shows an exemplary flow chart illustrating method steps for detecting obstacles by a vehicle, in accordance with some embodiments of the present disclosure.
Figure 4:
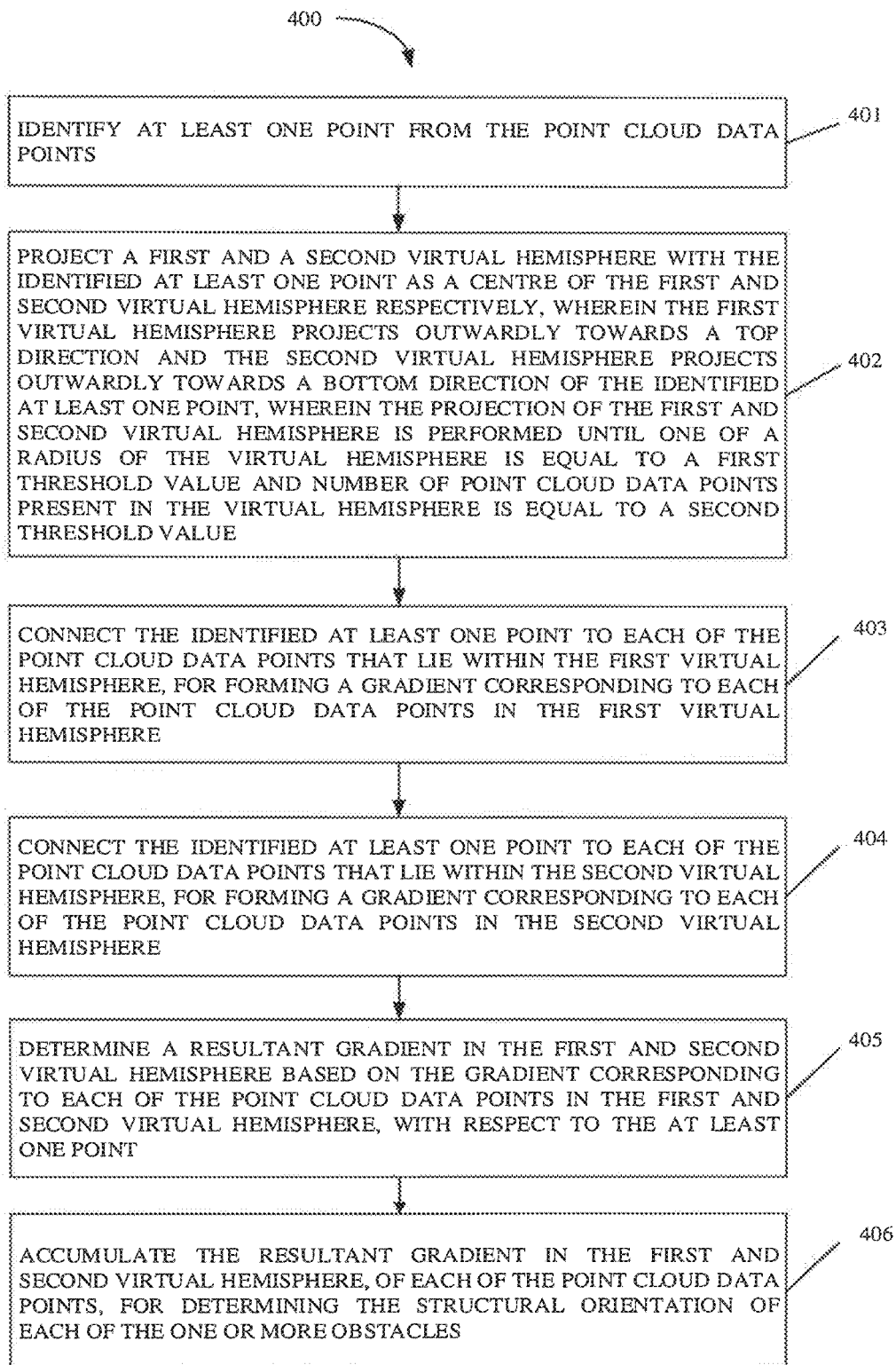
FIG. 4 shows an exemplary flow chart illustrating method steps for forming a gradient to determine a structural orientation of obstacles, in accordance with some embodiments of the present disclosure.

In an embodiment, the threshold data 208 may include information about the different thresholds used in the process of detecting each of the one or more obstacles in the surroundings of a vehicle. The threshold data 208 may include a first threshold, a second threshold, a distance error threshold and a height threshold. In an embodiment, the first threshold indicates a maximum limit on a radius of a virtual hemisphere, projected during formation of a gradient. The second threshold indicates a maximum limit on a number of point cloud data points that may lie within the virtual hemisphere. Details on formation of gradient may be found in the description of method steps 300 and method steps 400 as illustrated in FIG. 3 and FIG. 4 respectively. The distance error threshold value indicates a maximum limit for a distance error between pixels of the disparity image. The height threshold indicates a maximum limit on a height difference computed between at least two enhanced point cloud data points in each of one or more 2D virtual grids.

In an embodiment, the other data 209 may include, but is not limited to, obstacles data, traffic information, terrain information and the like.

In an embodiment, the data 204 in the memory 202 is processed by modules 210 of the ECU 103. As used herein, the term module refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. The modules 210 when configured with the functionality defined in the present disclosure will result in a novel hardware.

In one implementation, the modules 210 may include, for example, a communication module 211, a disparity image generation module 212, an obstacle region extraction module 213, a point cloud extraction module 214, a gradient determination module 215, a pixel-point cloud mapping module 216, an enhanced point cloud data processing module 217 and other modules 218. It will be appreciated that such aforementioned modules 210 may be represented as a single module or a combination of different modules. Further, person of ordinary skill in the art will appreciate that in an implementation, the modules 210 may be integrated with the memory 202.

The communication module 211 facilitates communication between the ECU 103 and other units (not shown in figures) of the vehicle. In an embodiment, the other units may comprise, but are not limited to, the imaging unit 101, the LIDAR unit 102 and the navigation unit 104. For example, the communication module 211 may receive the one or more images captured by the imaging unit 101 and may also receive the point cloud data produced by the LIDAR unit 102. In an embodiment, the communication module 211 may help in communication between the other units.

In an embodiment, the disparity image generation module 212 generates a disparity image. The disparity image generation module 212 may receive a pair of images captured by the imaging unit 101. In an exemplary embodiment, the pair of images may be captured using the stereo camera. Each of the two monocular cameras separated by the baseline distance and having same focus, captures an image. Further, the pair of images represent a same scene captured from two different views at a same time. The pair of images may be represented as a first image and a second image. The disparity image generation module 212 may match at least one pixel in the first image to a corresponding at least one pixel in the second image, and determine co-ordinates of each pixel in each of the first and the second image. Further, the disparity image generation module 212 computes a disparity value (pixel difference) between co-ordinates of each of the at least one pixel in the first image and co-ordinates of each of the at least one pixel in the second image. Here, the distance between the pixels represent a distance between, an object in the first image and the object in the second image. Thereafter, a disparity image is generated based on the pixel differences between the first and the second image. Thus, each pixel in the disparity image represents the distance/disparity value. Further, the disparity image generation module 212 may employ any image processing techniques to generate the disparity image. The disparity image may be generated by taking blocks of similar width in each pair of images. In an embodiment, the disparity image generation module 212 may employ Sum of Squared Difference (SSD) technique for generating the disparity image.

In an embodiment, the obstacle region extraction module 213 extracts one or more regions from the disparity image. Each of the one or more regions comprises an obstacle. The obstacle region extraction module 213 receives the disparity image from the disparity image generation module 212. Once the disparity image is generated, various image processing techniques may be employed to extract the one or more regions comprising the one or more obstacles. In an embodiment the obstacle region extraction module 213 may employ colour based segmentation to extract the one or more regions. The colour based segmentation is employed to separate each of the one or more obstacles at different depths. The colour based segmentation is based on a pixel/colour threshold value. If the pixel values are beyond the pixel/colour threshold value, the pixels are considered to indicate different contours. Thus, the disparity image is segmented into contours indicating the presence of the one or more obstacles. The segmented disparity image may be scanned horizontally from a top most pixel to a bottom most pixel to find boundaries of the contours. If the number of pixels exceeds a predefined pixel threshold, the horizontal line of pixels is considered as the boundary pixels of an identified obstacle. Hence, boundary points of the identified obstacle are extracted, and the boundary points provide a position of the obstacle in terms of image co-ordinates in the disparity image. Similarly, the boundary points are determined for the one or more obstacles.

In an embodiment, the point cloud extraction module 214 retrieves the point cloud data from the LIDAR data 206 and further receives the boundary points of the one or more obstacles from the obstacle region extraction module 213. Further, the point cloud extraction module 214 extracts the point cloud data points from the point cloud data based on the image co-ordinates of the boundary points of each of the one or more obstacles. Further, the image coordinates of the boundary points of each of the one or more obstacles are converted into spherical co-ordinates. The 3D co-ordinates of the point cloud data points are also converted into spherical co-ordinates. In an embodiment, the image co-ordinates and the point cloud data may be converted to any common co-ordinate system. The spherical co-ordinates of the boundary points of each of the one or more obstacles may be used for extracting the point cloud data points from the point cloud data, lying within the boundaries of each of the one or more obstacles.

In an embodiment, the placement of LIDAR unit 102 and the imaging unit 101 may be important for mapping the image co-ordinates with spherical co-ordinates. The scene viewed by the LIDAR unit 102 may be similar to the scene viewed by the imaging unit 101, therefore the placement of LIDAR unit 102 and the imaging unit 101 plays an important role. For example, the LIDAR unit 102 may be placed at a centre of the baseline in which the first monocular camera and second monocular camera are placed.

In an embodiment, the gradient determination module 215 is used to determine gradient for each of the point cloud data points extracted within the boundary points of each of the one or more obstacles. At least one point is chosen from the point cloud data points extracted within the boundary points of each of the one or more obstacles. The gradient determination module 215 projects a first virtual hemisphere and a second virtual hemisphere outwardly towards a top and a bottom from the at least one point. The projection of the first virtual hemisphere and the second virtual hemisphere is performed until one of a radius of virtual hemispheres is equal to the first threshold value and number of point cloud data points present in the virtual hemisphere is equal to the second threshold value. The gradient is determined for the at least one point by connecting the at least one point to each of the point cloud data points that lie within the first virtual hemisphere. Further, a resultant gradient is determined in the first virtual hemisphere based on the gradient corresponding to each of the point cloud data points in the first virtual hemisphere, with respect to the at least one point. Similarly, a gradient is determined in the second virtual hemisphere and a resultant gradient is determined in the second virtual hemisphere. The gradient determination module 215 accumulates the resultant gradient in the first virtual hemisphere and the second virtual hemisphere of each of the point cloud data points, lying within the boundary points of each of the one or more obstacles, for determining the structural orientation of each of the one or more obstacles.

In an embodiment, the pixel-point cloud mapping module 216 maps each pixel within the boundary points of the identified obstacle in the disparity image to the gradient formed for each of the point cloud data points, lying within the boundary points of the identified obstacle. In an embodiment the image coordinate of each pixel is converted into the spherical co-ordinates. The spherical co-ordinates of each pixel is mapped to the spherical co-ordinates of the gradient formed for each of the point cloud data points. The gradient having the spherical co-ordinates same as the spherical co-ordinates of a pixel in the disparity image is chosen. The point cloud data corresponding to the point cloud data points, lying within the boundary points of each of the one or more obstacles is enhanced with the corresponding pixel data within the boundary points of the identified obstacle in the disparity image.

In an embodiment, the enhanced point cloud data processing module 217 receives the enhanced point cloud data from the pixel-point cloud mapping module 216. The enhanced point cloud data processing module 217 processes the enhanced point cloud data to determine a structure, an orientation and a location of each of the one or more obstacles. The LIDAR map comprising the point cloud data is divided into plurality of two Dimensional (2D) virtual grids. Each of the plurality of 2D virtual grids comprises a plurality of enhanced point cloud data points. The enhanced point cloud data processing module 217 detects one or more 2D virtual grids from the plurality of 2D virtual grids representing the one or more obstacles. Detection of the one or more obstacles may be based on a height difference between at least two enhanced point cloud data points in each of the one or more 2D virtual grids, where the height difference exceeds a height threshold.

In an embodiment, the other modules 218 may include, but is not limited to, an indication module to indicate the one or more obstacles detected by the ECU 103, etc. The indication module may display the one or more obstacles to a user. The indication module may be one of, but not limited to, a monitor, a Liquid Crystal Display (LCD), a Light Emitting Diode (LED) display and/or any other module present which is capable of displaying an output. In an embodiment the indication module may be present in a user device.

FIG. 3 shows an exemplary flow chart illustrating method 300 steps for detecting obstacles by a vehicle, in accordance with some embodiments of the present disclosure.

Figure 5:
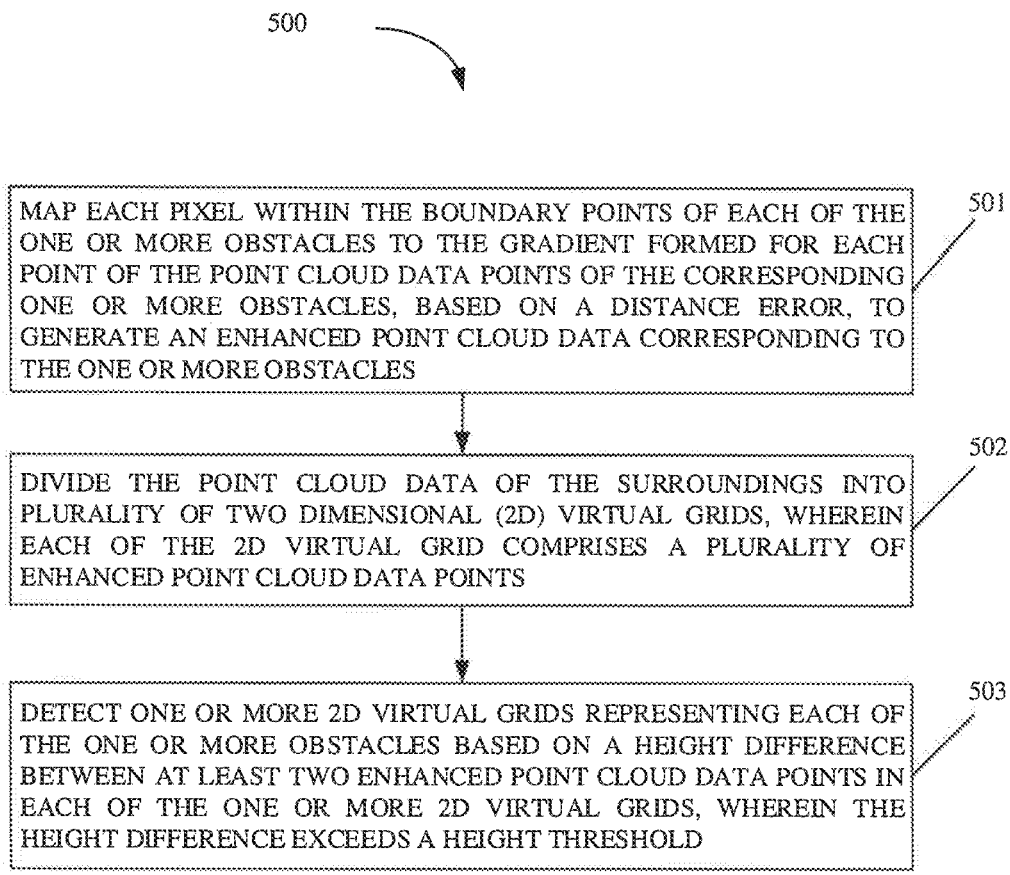
FIG. 5 shows an exemplary flow chart illustrating method steps for detecting obstacles using enhanced point cloud data, in accordance with some embodiments of the present disclosure.

As illustrated in FIG. 3, FIG. 4 and FIG. 5 the methods 300, method 400 and method 500 respectively may comprise one or more steps for detecting obstacles by an autonomous vehicle, in accordance with some embodiments of the present disclosure. The methods 300, 400 and 500 may be described in the general context of computer executable instructions. Generally, computer executable instructions can include routines, programs, objects, components, data structures, procedures, modules, and functions, which perform particular functions or implement particular abstract data types.

The order in which the method 300, method 400 and method 500 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At step 301, the communication module 211 receives one or more images of surroundings of the vehicle from the imaging unit 101. The ECU 103 further receives the point loud data of the surroundings of the vehicle from the LIDAR unit 102.

At step 302, the disparity image generation module 212 receives one or more images of surroundings of the vehicle from the communication module 211. The disparity image generation module 212 may generate a disparity image based on the pair of images of the one or more images. In an embodiment, the pair of images are the images captured by the imaging unit 101 comprising two monocular cameras separated by the baseline distance. Further, the pair of images are of a same scene captured from two different views at a same time. The pair of images may be represented as a first image and a second image.

The disparity image generation module 212 may map every pixel in the first image, to a corresponding pixel in the second image and compute a disparity value. The disparity value indicates a pixel difference between the two images to produce a disparity image. Each pixel in the disparity image also comprises the disparity value. The disparity image may be used for detecting the one or more obstacles. Further, the disparity image generation module 212 may employ any image processing technique to generate the disparity image. The disparity image may be generated by taking blocks of similar width in each of the pair of images. In an embodiment, the disparity image generation module 212 may employ Sum of Squared Difference (SSD) technique for generation of disparity image.

Considering an example for disparity image generation. Let (a, b) be the co-ordinate of a pixel in image A, and the co-ordinate of a corresponding pixel in image B be (c, d). The disparity value is calculated as (a–c) as the value of (b–d) may be zero or a negligible value. and a similar loop is carried out for all the co-ordinates in the pair of images. To compare image A with image B, the co-ordinate of corresponding pixels in image A and image B are compared. The two images in comparison are of the same size, pixel-wise. By generating the disparity image, objects present at different depths in the pair of images may be separated.

Figure 6A:
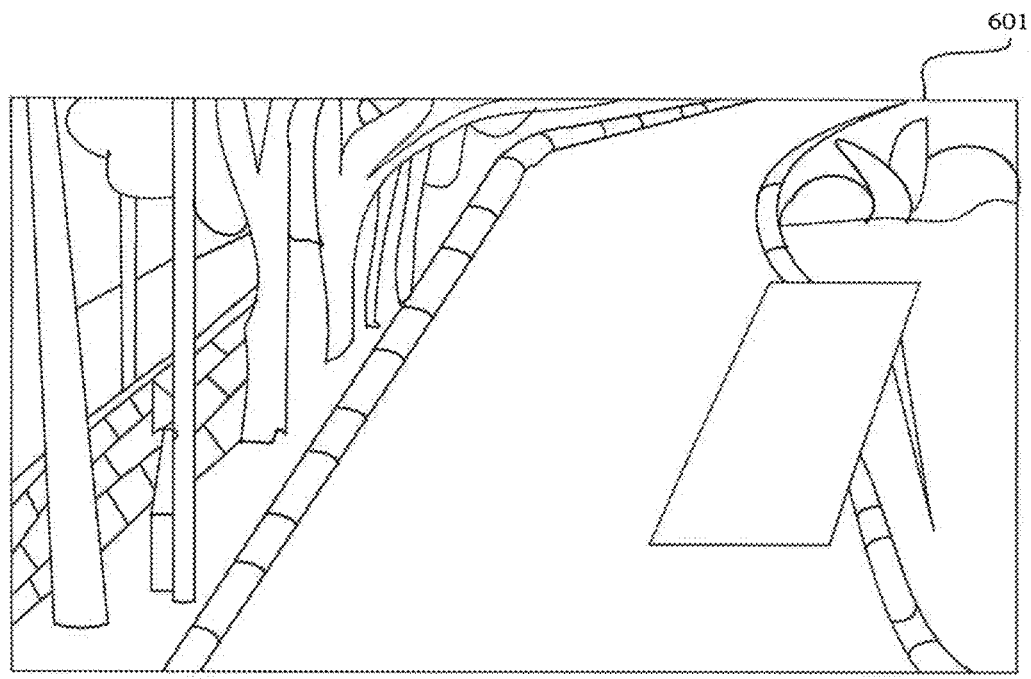
FIG. 6A shows a disparity image, generated by the ECU of an obstacle detection system 100, in accordance with some embodiments of the present disclosure.

FIG. 6A shows a disparity image 601, generated by the ECU 103 of an obstacle detection system 100, in accordance with some embodiments of the present disclosure. The disparity image 601 as illustrated in FIG. 6A may be generated by the disparity image generation module 212. The disparity image 601 is generated based on the pair of images of surroundings of the vehicle, captured by the imaging unit 101. The surroundings of the vehicle may comprise one or more obstacles.

Figure 6B:
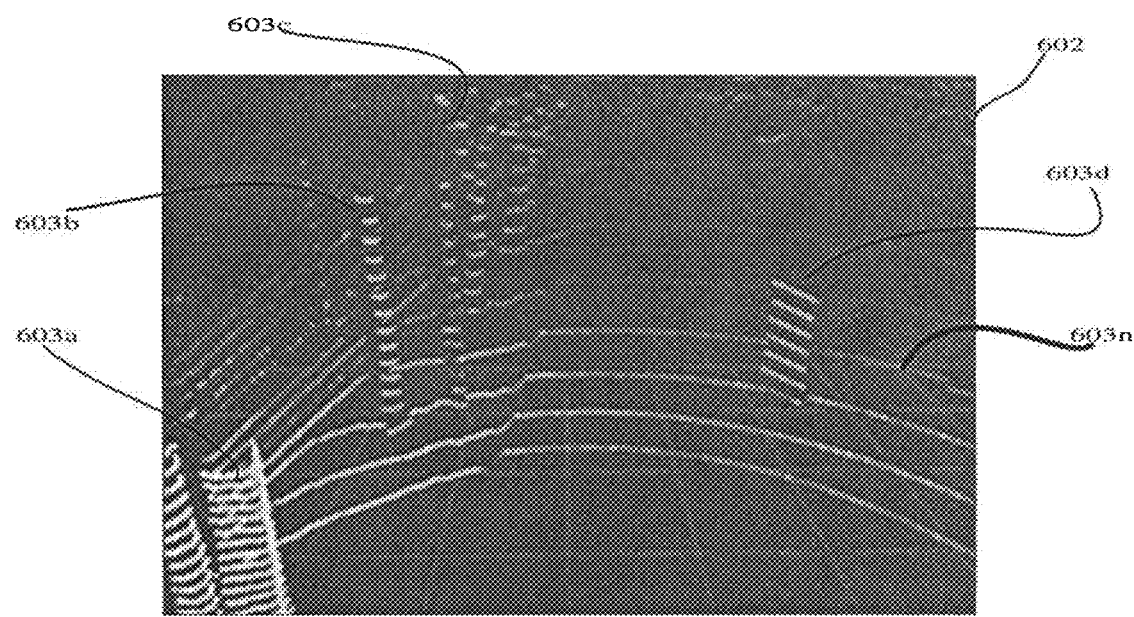
FIG. 6B shows a LIDAR map of surroundings of a vehicle for detecting obstacles around the vehicle, in accordance with some embodiments of the present disclosure.

FIG. 6B shows a LIDAR map indicative of a point cloud data 602 of the surroundings for detecting obstacles around the vehicle, in accordance with some embodiments of the present disclosure. The surroundings illustrated in FIG. 6B is same as the surroundings shown in FIG. 6A. The point cloud data of the surroundings comprises several point cloud data points 603a, 603b, 603c . . . , 603n, indicating one or more objects in the surroundings as illustrated in FIG. 6B.

Referring back to FIG. 3, at step 303, the obstacle region extraction module 213 may extract one or more regions in the disparity image. Each of the one or more regions comprises an obstacle. The obstacle region extraction module 213 receives the disparity image from the disparity image generation module 212, stored as the disparity image data 207. Once the disparity map is generated, various image processing techniques are employed to extract the one or more regions comprising the one or more obstacles.

In an embodiment the obstacle region extraction module 213 may employ colour based segmentation to extract the one or more regions from the disparity image. The colour based segmentation is employed to separate each of the one or more obstacles at different depths. The colour based segmentation is based on a pixel/colour threshold value. If the pixel values are beyond the pixel/colour threshold value, the pixels are considered to indicate different contours. Thus, the disparity image is segmented into contours indicating the presence of the one or more obstacles. The segmented disparity image may be scanned horizontally from a top most pixel to a bottom most pixel to find boundaries of the contours. If the number of pixels exceeds a predefined pixel threshold, the horizontal line of pixels is considered as the boundary pixels of an identified obstacle. Hence, boundary points of the identified obstacle are extracted, and the boundary points provides a position of the obstacle in terms of image co-ordinates in the disparity image. Similarly, the boundary points are determined for the one or more obstacles.

Figure 7A:
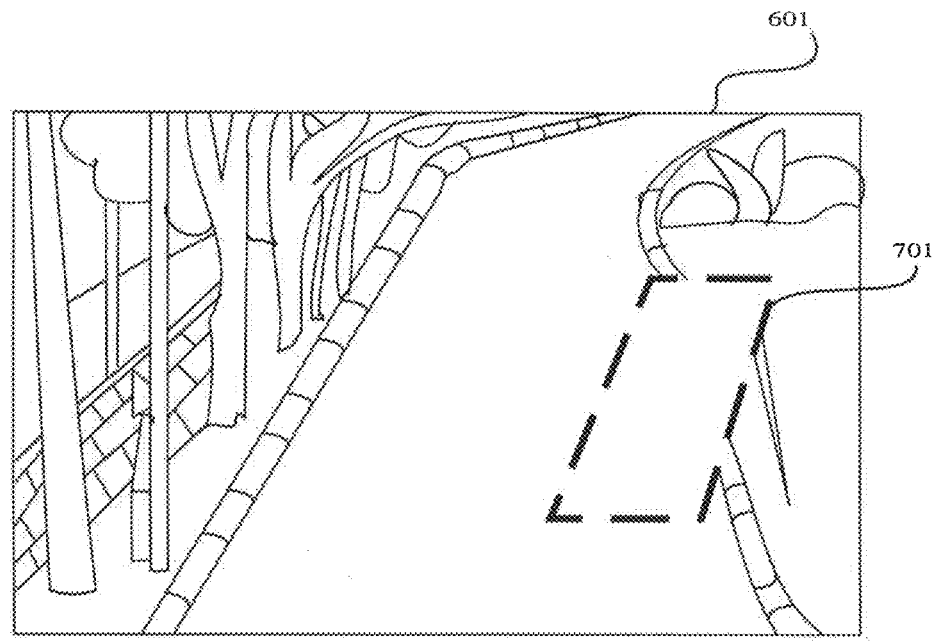
FIG. 7A is indicative of an obstacle region extracted from a disparity image, in accordance with some embodiments of the present disclosure.

FIG. 7A is indicative of an obstacle region extracted from the disparity image 601, in accordance with some embodiments of the present disclosure. FIG. 7A comprises an extracted region having an obstacle 701, illustrated in bold dotted line. The extracted region having the obstacle 701 is present in the disparity image 601. Various image processing techniques may be employed by the obstacle region extraction module 213 for determining the extracted region having the obstacle 701.

Referring back to FIG. 3, at step 304, boundary points of the one or more obstacles are determined. The boundary points of the one or more obstacles provides the position of the corresponding obstacle in terms of image co-ordinates in the disparity image.

Figure 7B:
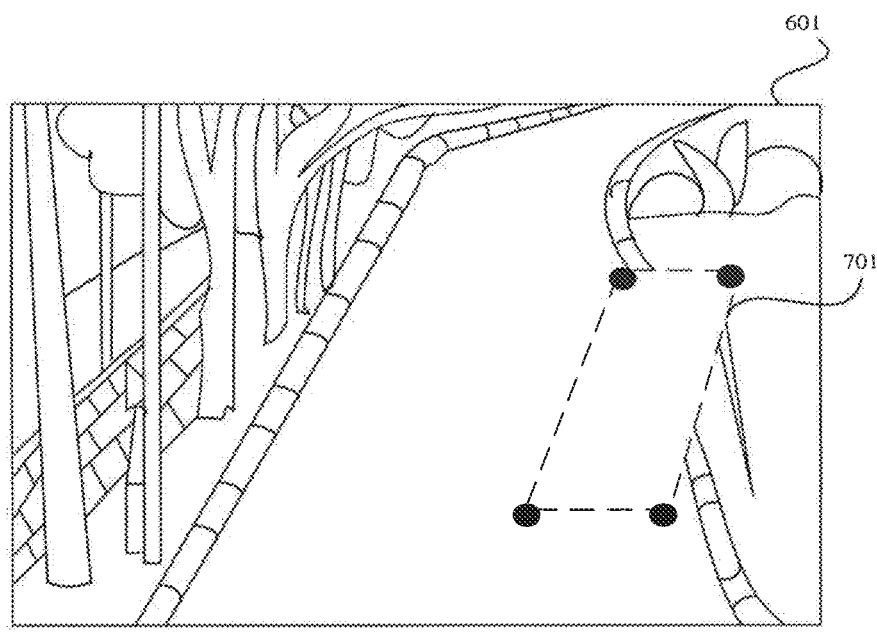
FIG. 7B is indicative of boundary point of obstacles present in the disparity image, in accordance with some embodiments of the present disclosure.

FIG. 7B is indicative of boundary point of obstacles present in the disparity image 601, in accordance with some embodiments of the present disclosure. As illustrated in FIG. 7B, boundary points along the corners of the obstacle 701 are determined based on the extracted region (as illustrated in FIG. 6A). The boundary points of the obstacle 701 are indicated in bold dots along the corners of the obstacle 701, in FIG. 7B. The boundary points of the obstacle 701 are identified by the image co-ordinates in the disparity image 601.

Referring back to FIG. 3, at step 305, the point cloud extraction module 214 may retrieve the point cloud data from the LIDAR data 206. Further, the point cloud extraction module 214 extracts the point cloud data points from the point cloud data based on the image co-ordinates of the boundary points of each of the one or more obstacles. The point cloud extraction module 214 receives the point cloud data from the LIDAR unit 102. The image coordinates of the boundary points of each of the one or more obstacles are converted into spherical co-ordinates. The conversion of image co-ordinates into spherical co-ordinates ($\theta_i$ and $\varphi_i$) may be computed using equations 1-4 mentioned below.

$$PW = W/FOV(w) \quad (1)$$

$$PH = H/FOV(h) \quad (2)$$

$$\theta_i = \frac{(W - X(\text{image})) - C_w}{PW} \quad (3)$$

$$\varphi_i = \frac{(H - Y(\text{image})) - C_h}{PH} \quad (4)$$

where,
PW is pixel per degree of width,
PH is pixel per degree of height,
$\theta_i$ is elevation angle,
$\varphi_i$ is azimuth angle,
W is width of the disparity image in pixels,
H is height of the disparity image in pixels,
FOV (w) is Field of View along the width of disparity image,
FOV (h)=Field of View along the width of disparity image,
$C_w$=center pixel with respect to width of disparity image,
$C_h$=center pixel with respect to height of disparity image.
X, Y are image coordinates.

Further, the 3D co-ordinates (x, y, z) of the point cloud data points are also converted into spherical co-ordinates (r, $\theta_p$, $\varphi_p$) using equations 5-7 mentioned below.

$$r = \sqrt{x^2 + y^2 + z^2} \quad (5)$$

$$\theta_p = \arccos(z/r) \quad (6)$$

$$\varphi_p = \arctan(y/x) \quad (7)$$

where,
r is radial distance,
$\theta_p$ is the elevation angle,
$\varphi_p$ is the azimuth angle.

$\theta_i$ and $\varphi_i$ define the elevation angle and azimuth angle of each of the boundary points (determined form the disparity image) of each of the one or more obstacles, respectively. r, $\theta_p$ and $\varphi_p$ define the radial distance, elevation angle and azimuth angle of each of the point cloud data points. The point cloud data points that lie at the same elevation and azimuth angle as that of the boundary points of each of the one or more obstacles are extracted. Further, using the extracted point cloud data points all the point cloud data points that lie within the boundary points are extracted. Thus, each of the one or more obstacles are now defined by the point cloud data points that lie within the boundary points of the corresponding obstacle, extracted from the point cloud data.

The spherical co-ordinates of the boundary points of each of the one or more obstacles may be used for extracting the point cloud data points from the point cloud data, lying within the boundary points of each of the one or more obstacles.

In an embodiment, the image co-ordinates of the boundary points of each of the one or more obstacle and the 3D co-ordinates of the point cloud data points may be converted to a common co-ordinate system and compared, for the extraction of point cloud data points.

In an embodiment, the placement of LIDAR unit 102 and the imaging unit 101 may be important for mapping the image co-ordinates with spherical co-ordinates. The scene viewed by the LIDAR unit 102 may be similar to the scene viewed by the imaging unit 101, therefore the placement of LIDAR unit 102 and the imaging unit 101 plays an important role. For example, the LIDAR unit 102 may be placed at a centre of the baseline in which the first monocular camera and second monocular camera are placed.

Figure 8:
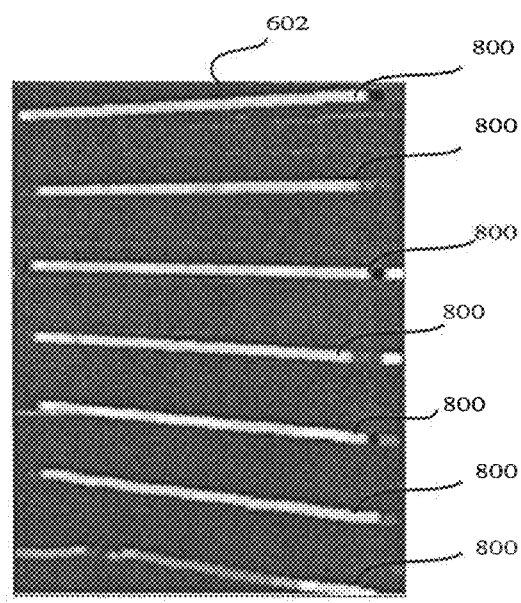
FIG. 8 is indicative of point cloud data points extracted using boundary points of obstacles, in accordance with some embodiments of the present disclosure.

FIG. 8 is indicative of point cloud data points extracted using boundary points of obstacles, in accordance with some embodiments of the present disclosure. The point cloud data points 800 pertaining to the obstacle 701 are extracted from the point cloud data 602 (illustrated in FIG. 6B) of the surroundings of the vehicle. The extracted point cloud data points are illustrated in FIG. 8. The point cloud data points 800 pertaining to the obstacle 701 are extracted based on the image co-ordinates of the boundary points of the obstacle 701. The extraction of point cloud data points is as per the steps defined in the method step 305.

Referring back to FIG. 3, at step 306, the gradient determination module 215 may determine a gradient for each of the point cloud data points extracted within the boundary points of the one or more obstacles. Thus, the structural orientation of each of the one or more obstacles is determined, thereby detecting each of the one or more obstacles.

FIG. 4 shows an exemplary flow chart illustrating method steps 400 for forming a gradient to determine a structural orientation of obstacles, in accordance with some embodiments of the present disclosure.

At step 401, the gradient determination module 215 is used to determine gradient for each of the point cloud data points extracted within the boundary points of the one or more obstacles. At least one point is chosen from the point cloud data points extracted within the boundary points of the one or more obstacles.

Figure 9A:
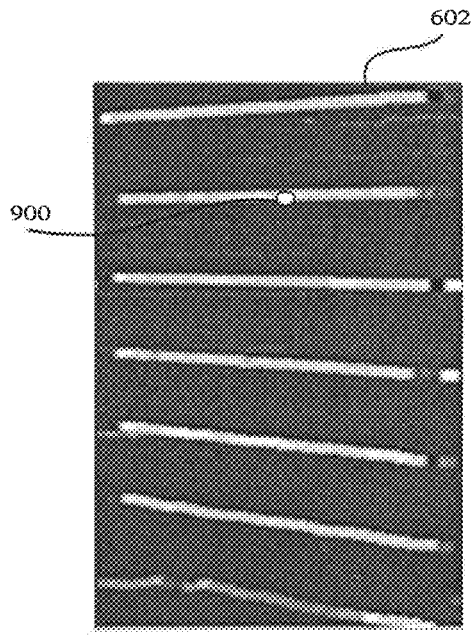
FIG. 9A, FIG. 9B, FIG. 9C, FIG. 9D and FIG. 9E are indicative of gradient formation for point cloud data points corresponding to obstacles, in accordance with some embodiments of the present disclosure.

FIG. 9A, FIG. 9B, FIG. 9C, FIG. 9D and FIG. 9E are indicative of gradient formation for point cloud data points corresponding to obstacles, in accordance with some embodiments of the present disclosure. As illustrated in FIG. 9A at least one point cloud data point 900 is chosen from the point cloud data points 800 pertaining to the obstacle 701.

Referring back to FIG. 4, at step 402, the gradient determination module 215 projects a first virtual hemisphere and a second virtual hemisphere outwardly towards the top and bottom of the chosen at least one point. The first virtual hemisphere and the second virtual hemisphere is projected with the chosen at least one point as a centre of the first virtual hemisphere and the second virtual hemisphere respectively. The first virtual hemisphere may be projected outwardly towards a top direction and the second virtual hemisphere may be projected outwardly towards a bottom direction of the chosen at least one point. The projection of the first virtual hemisphere and the second virtual hemisphere is performed until one of a radius of virtual hemispheres is equal to the first threshold value and number of point cloud data points present in the virtual hemisphere is equal to the second threshold value.

Figure 9B:
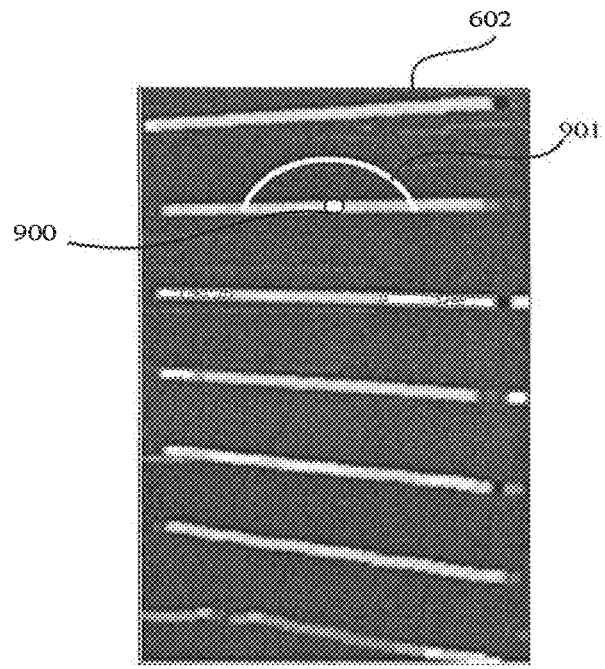
Figure 9C:
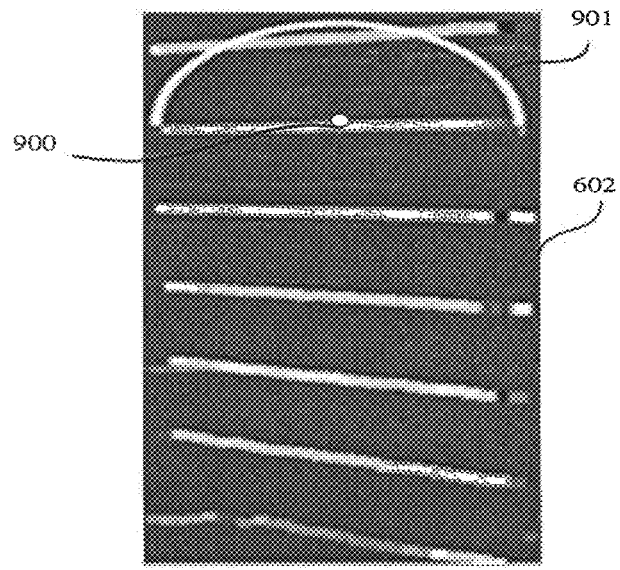

As illustrated in FIG. 9B, a first virtual hemisphere 901 is projected outwardly towards a top direction of the at least one point cloud data point 900 as a centre. Radius of the first virtual hemisphere 901 is within the first threshold value and also none of the point cloud data points lie within the first virtual hemisphere as illustrated by the FIG. 9B. Thus, the first virtual hemisphere 901 is further projected in the top direction as illustrated in FIG. 9C. The radius of the first virtual hemisphere 901 may now be equal to the first threshold value or the number of point cloud data points that lie within the first virtual hemisphere 901 may be equal to the second threshold value. Thus, the projection of the first virtual hemisphere 901 may be stopped. Similarly, a second virtual hemisphere (not shown) may be projected towards a bottom direction of the at least one point cloud data point 900 as a centre.

Referring back to FIG. 4, at step 403 and step 404, the gradient determination module 215 determines gradient for the chosen at least one point by connecting the at least one point to each of the point cloud data points that lie within the first virtual hemisphere, for forming a gradient corresponding to each of the point cloud data points in the first virtual hemisphere. Further, at step 404 the gradient determination module 215 determines gradient for the at least one point by connecting the at least one point to each of the point cloud data points that lie within the second virtual hemisphere, for forming a gradient corresponding to each of the point cloud data points in the second virtual hemisphere.

Figure 9D:
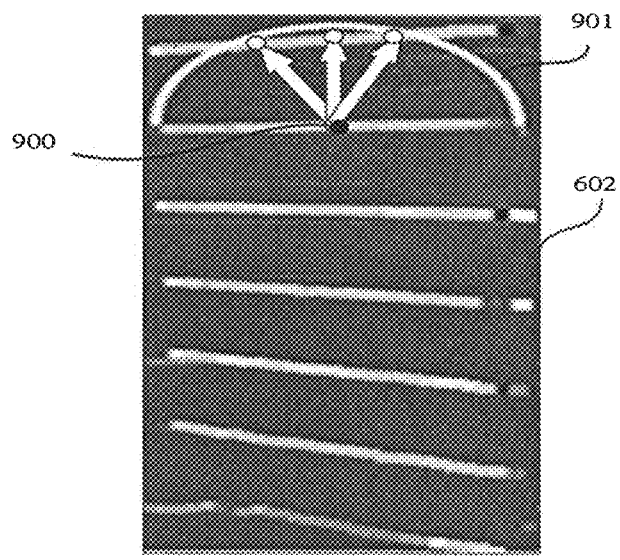

As illustrated in FIG. 9D, the at least one point cloud data point 900 is connected to three point cloud data points that lie within the first virtual hemisphere 901, via a first gradient, a second gradient and a third gradient. Similarly, gradients may be formed in the second virtual hemisphere (not shown) by connecting the at least one point cloud data point 900 to the point cloud data points that lie within the second virtual hemisphere.

Referring back to FIG. 4, at step 405, the gradient determination module 215 may determine a resultant gradient in the first virtual hemisphere and the second virtual hemisphere based on the gradient corresponding to each of the point cloud data points in the first virtual hemisphere and the second virtual hemisphere, with respect to the at least one point. The resultant gradient determined for a selected point defines the orientation of the selected point.

Figure 9E:
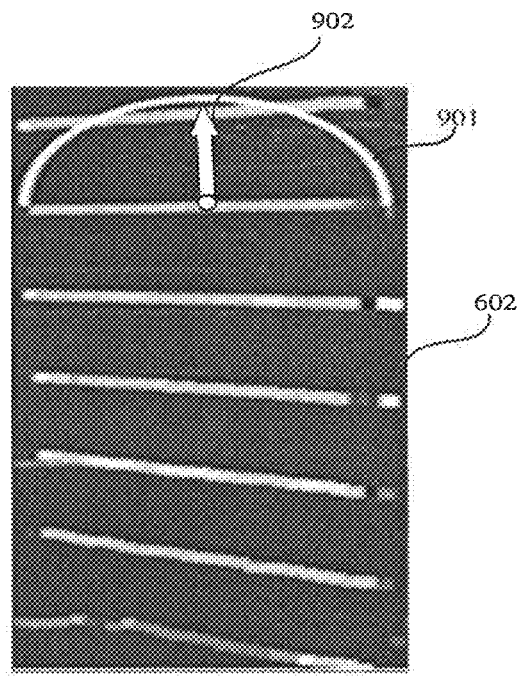

As illustrated in FIG. 9E, a resultant gradient 902 is determined for the first gradient, the second gradient and the third gradient present in the first virtual hemisphere 901. The resultant gradient 902 provides the orientation of the point cloud data point 800. Similarly, a resultant gradient is determined in the second virtual hemisphere (not shown).

Referring back to FIG. 4, at step 406, the resultant gradient in the first virtual hemisphere and the second virtual hemisphere, of each of the point cloud data points, are accumulated. The gradient determination module 215 accumulates the resultant gradient in the first virtual hemisphere and the second virtual hemisphere of each of the point cloud data points, lying within the boundary points of the one or more obstacles for determining the structural orientation of the one or more obstacles. The resultant gradient determined for a selected point provides the orientation of the selected point. Thus, by determining a resultant gradient for each of the point cloud data points that lie within the one or more obstacles, the structural orientation of the one or more obstacles may be determined.

FIG. 5 shows an exemplary flow chart illustrating method steps 500 for detecting obstacles using enhanced point cloud data, in accordance with some embodiments of the present disclosure.

At step 501, the pixel-point cloud mapping module 216 maps each pixel within the boundary points of the identified obstacle in the disparity image to gradient formed for each of the point cloud data points, lying within the boundary points of the identified obstacle. In an embodiment the image coordinates of each pixel are converted into the spherical co-ordinates ($\theta_i$ and $\varphi_i$). The spherical co-ordinates of each pixel are mapped to the spherical co-ordinates of the gradient formed for each of the point cloud data points. The gradient whose direction is along the spherical co-ordinates of a given pixel is chosen. The disparity image may not have accurate data about the distance of the one or more obstacles. While mapping each pixel in the disparity image to a corresponding gradient, an error is computed at which the disparity map perceives the object. The distance error is computed for each pixel using equation as mentioned below.

Distance error=gradient position (used for comparison)−disparity value of the pixel If the distance error for a given pixel is within the distance error threshold (when mapped with a selected gradient), the given pixel is mapped to the selected gradient. Similarly, each pixel is mapped to a gradient. If the distance error for a given pixel is greater than the distance error threshold (when mapped with a selected gradient), an implication may be provided that that there may be a projection in the obstacle which is not detected by the LIDAR unit 102. Such pixels are mapped with the help of a stored error value rather than gradients. Thus, the point cloud data corresponding to the point cloud data points, lying within the boundary points of each of the one or more obstacles is enhanced with the corresponding pixel data within the boundary points of the identified obstacle in the disparity image. Thus, producing enhanced point cloud data points for each of the one or more obstacles.

Figure 10:
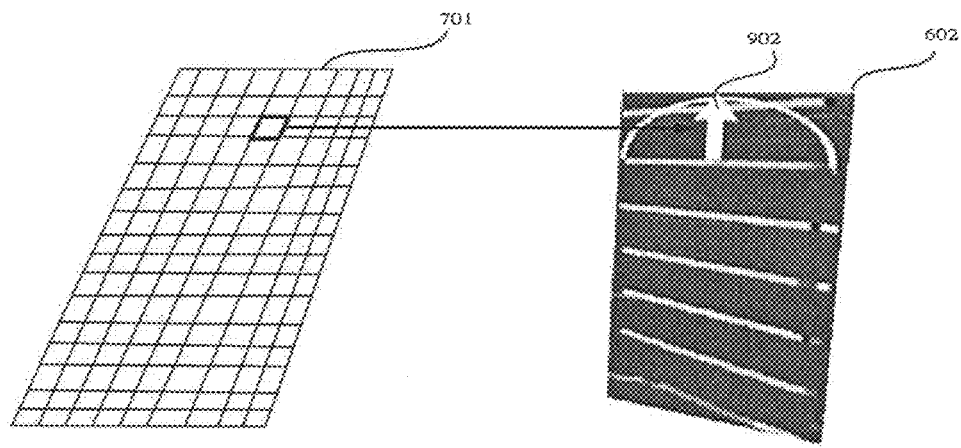
FIG. 10 illustrates pixel to point cloud mapping, in accordance with some embodiments of the present disclosure.

FIG. 10 illustrates the pixel to point cloud mapping, in accordance with some embodiments of the present disclosure. As illustrated in FIG. 9, each pixel present within the boundary point (as illustrated in FIG. 6B) of the obstacle 701 are mapped to a corresponding resultant gradient formed for each of the point cloud data points 800 pertaining to the obstacle 701. Thus, the mapping results in enhancing the point cloud data points 800.

Referring back to FIG. 5 at step 502, the enhanced point cloud data processing module 217 divides the LIDAR map of the surroundings into plurality of two Dimensional (2D) virtual grids, wherein each of the 2D virtual grid comprises a plurality of enhanced point cloud data points.

Figure 11:
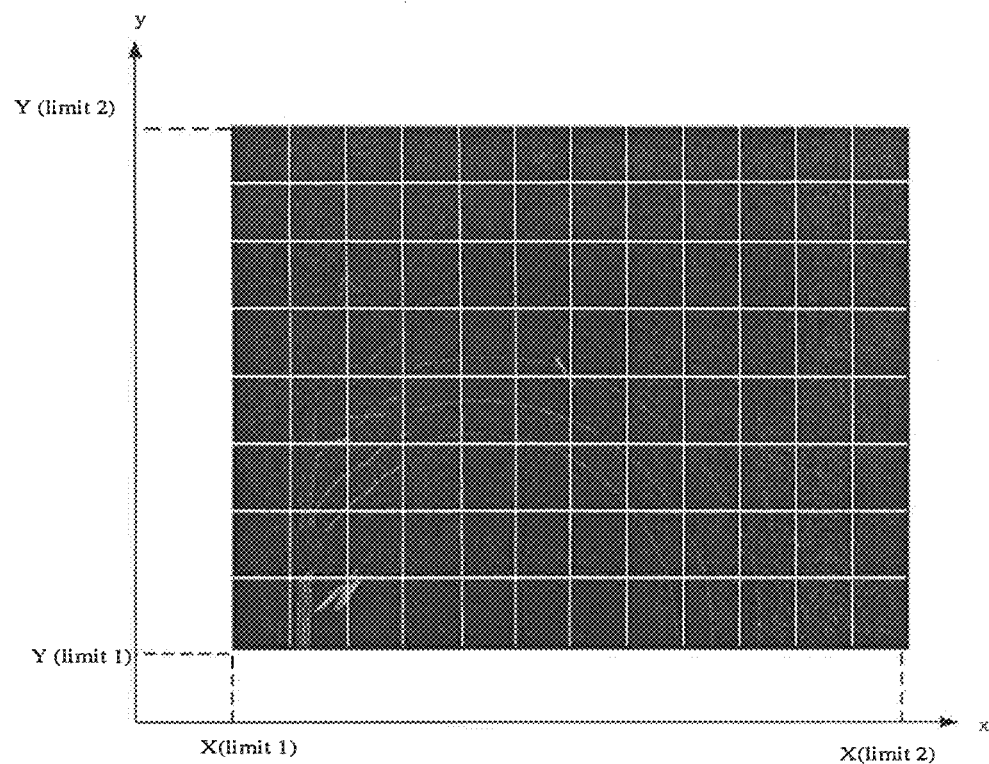
FIG. 11 is indicative of formation of 2D virtual grids on the LIDAR map, for detecting the obstacles, in accordance with some embodiments of the present disclosure.

FIG. 11 is indicative of formation of 2D virtual grids on the LIDAR map, for detecting the obstacles, in accordance with some embodiments of the present disclosure. The LIDAR map comprises the point cloud data 602. The point cloud data 602 of the surroundings with enhanced point cloud data points 800, corresponding to the obstacle 701 is divided into plurality of 2 dimensional (2D) virtual grids. The plurality of 2D virtual grids are present in a virtual rectangular bar defined by the limits x (limit 1) and x (limit 2) along x-axis and y (limit 1) and y (limit 2) along the y-axis. The limits along the x-axis and the y-axis are decided based on the range of the LIDAR unit 102. The enhanced point cloud data points 800 are present within at least one of the plurality of virtual grids. Each of the plurality of the virtual grids are defined by a grid index. The enhanced point cloud data points that lie within a virtual grid are saved into the corresponding virtual grid bearing a grid index.

Referring back to FIG. 5, at step 503, a first point and a second point are determined in each of the 2D virtual grids. The first point may be a maximum height valued point and the second point may be a minimum height valued point. The enhanced point cloud data processing module 217 may compute the height difference between the first point and the second point. The grid where the height difference exceeds the height threshold is marked as an obstacle grid. The above step is repeated for each of the plurality of 2D virtual grids.

Thus, height of each of the one or more obstacles is determined. Each of the 2D virtual grids marked as an obstacle grid are grouped together to locate the obstacle with accurate location.

In an embodiment, the gradient and the virtual grid may be used together to determine structure, orientation and height of the one or more obstacles.

In an embodiment, the method steps 300, method steps 400 and method steps 500 are performed in real-time.

In an embodiment, the present disclosure discloses a method and an obstacle detection system for detecting the one or more obstacles present in the surroundings of an autonomous vehicle. The disclosed obstacle detection system provides accurate location, structure and orientation of the obstacles present around the autonomous vehicle thereby allowing the autonomous vehicle to manoeuvre obstacles easily even when the vehicle is moving at greater speeds.

In an embodiment, the present disclosure discloses a method and an obstacle detection system which does not need prior frame data from the LIDAR unit and the imaging unit, thereby making the system independent and efficient.

In an embodiment, the present disclosure discloses a method and an obstacle detection system which detects the obstacles present at a far distance from the autonomous vehicle with accuracy.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3, FIG. 4 and FIG. 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
| --- | --- |
| 100 | Obstacle detection system |
| 101 | Imaging unit |
| 102 | LIDAR unit |
| 103 | Electronic Control Unit (ECU) |
| 104 | Navigation unit |
| 201 | I/O Interface |
| 202 | Memory |
| 203 | Processor |
| 204 | Data |
| 205 | Image data |
| 206 | LIDAR data |
| 207 | Disparity image data |
| 208 | Threshold data |
| 209 | Other data |
| 210 | Modules |
| 211 | Communication module |
| 212 | Disparity image generation module |
| 213 | Obstacle region extraction module |
| 214 | Point cloud extraction module |
| 215 | Gradient determination module |
| 216 | Pixel-point cloud mapping module |
| 217 | Enhanced point cloud data processing module |
| 218 | Other modules |
| 600 | Surroundings |
| 601 | Disparity image |
| 602 | Point cloud data |
| 701 | Obstacle |

We claim:

1. A method for obstacle detection by a vehicle in real-time, comprising:
receiving, by an Electronic Control Unit (ECU) of a vehicle, one or more images of surroundings of the vehicle from an imaging unit and point cloud data of the surroundings of the vehicle from a Light Detection and Ranging (LIDAR) unit;
generating, by the ECU, a disparity image by analysing the one or more images;
extracting, by the ECU, one or more regions comprising one or more obstacles, from the disparity image;
determining, by the ECU, boundary points of each of the one or more obstacles, for determining a position of each of the one or more obstacles in terms of image co-ordinates in the disparity image;
extracting, by the ECU, point cloud data points from the point cloud data based on the image co-ordinates of the boundary points corresponding to the one or more obstacles; and
determining, by the ECU, a gradient for each of the extracted point cloud data points to determine a structural orientation of the one or more obstacles, thereby detecting the one or more obstacles.

2. The method as claimed in claim 1, wherein determining the structural orientation of the one or more obstacles comprises:
identifying, by the ECU, one point from the point cloud data points;
projecting, by the ECU, a first virtual hemisphere and a second virtual hemisphere with the identified one point as a centre of the first virtual hemisphere and the second virtual hemisphere, wherein the first virtual hemisphere projects outwardly towards a top direction and the second virtual hemisphere projects outwardly towards a bottom direction of the identified one point, wherein the projection of the first virtual hemisphere and the second virtual hemisphere is performed until one of a radius of virtual hemispheres is equal to a first threshold value and number of point cloud data points present in the virtual hemisphere is equal to a second threshold value; and
connecting, by the ECU, the identified one point to each of the point cloud data points that lie within the first virtual hemisphere, for forming a gradient corresponding to each of the point cloud data points in the first virtual hemisphere;
connecting, by the ECU, the identified one point to each of the point cloud data points that lie within the second virtual hemisphere, for forming a gradient corresponding to each of the point cloud data points in the second virtual hemisphere;
determining, by the ECU, a resultant gradient in the first virtual hemisphere and the second virtual hemisphere based on the gradient corresponding to each of the point cloud data points in the first virtual hemisphere and the second virtual hemisphere, with respect to the identified one point; and
accumulating, by the ECU, the resultant gradient in the first virtual hemisphere and the second virtual hemisphere, of each of the point cloud data points, for determining the structural orientation of the one or more obstacles.

3. The method as claimed in claim 1, wherein detecting each of the one or more obstacles comprises:
mapping, by the ECU, each pixel within the boundary points of each of the one or more obstacles to the gradient formed for each point of the point cloud data points of the corresponding one or more obstacles, based on a distance error, to generate an enhanced point cloud data corresponding to the one or more obstacles;
dividing, by the ECU, the point cloud data of the surroundings into plurality of two Dimensional (2D) virtual grids, wherein each of the 2D virtual grid comprises a plurality of enhanced point cloud data points; and
detecting, by the ECU, one or more 2D virtual grids representing each of the one or more obstacles based on a height difference between at least two enhanced point cloud data points in each of the one or more 2D virtual grids, wherein the height difference exceeds a height threshold.

4. The method as claimed in claim 1, wherein the point cloud data of the surroundings comprises a plurality of 3-Dimensional (3D) data points defined by corresponding cartesian co-ordinates.

5. The method as claimed in claim 1, wherein the disparity image is generated from the one or more images comprising a first image and a second image, wherein generating of the disparity image comprises:
- matching each pixel in the first image to a corresponding pixel in the second image;
- computing a disparity value between each pixel in the first image to a corresponding pixel in the second image; and
- generating a disparity image based on the disparity value, wherein each pixel in the disparity image comprises the disparity value.

6. An obstacle detection system for detecting obstacles by a vehicle in real-time, the obstacle detection system comprising:
- an Electronic Control Unit (ECU), configured to:
- receive, one or more images of surroundings of the vehicle from an imaging unit and point cloud data of the surroundings of the vehicle from a Light Detection and Ranging (LIDAR) unit;
- generate, a disparity image by analysing the one or more images;
- extract, one or more regions comprising one or more obstacles, from the disparity image;
- determine, boundary points of each of the one or more obstacles, for determining a position of each of the one or more obstacles in terms of image co-ordinates in the disparity image;
- extract, point cloud data points from the point cloud data based on the image co-ordinates of the boundary points corresponding to the one or more obstacles; and
- determine, a gradient for each of the extracted point cloud data points to determine a structural orientation of the one or more obstacles, thereby detecting each of the one or more obstacles.

7. The obstacle detection system as claimed in claim 6, wherein during determining the structural orientation of the one or more obstacles, the ECU is configured to:
- identify, one point from the point cloud data points;
- project, a first virtual hemisphere and a second virtual hemisphere with the identified one point as a centre of the first virtual hemisphere and the second virtual hemisphere, wherein the first virtual hemisphere projects outwardly towards a top direction and the second virtual hemisphere projects outwardly towards a bottom direction of the identified one point, wherein the projection of the first virtual hemisphere and the second virtual hemisphere is performed until one of a radius of virtual hemispheres is equal to a first threshold value and number of point cloud data points present in the virtual hemisphere is equal to a second threshold value;
- connect, the identified one point to each of the point cloud data points that lie within the first virtual hemisphere, for forming a gradient corresponding to each of the point cloud data points in the first virtual hemisphere;
- connect, the identified one point to each of the point cloud data points that lie within the second virtual hemisphere, for forming a gradient corresponding to each of the point cloud data points in the second virtual hemisphere;
- determine, a resultant gradient in the first virtual hemisphere and the second virtual hemisphere based on the gradient corresponding to each of the point cloud data points in the first virtual hemisphere and the second virtual hemisphere, with respect to the identified one point; and
- accumulate, the resultant gradient in the first virtual hemisphere and the second virtual hemisphere, of each of the point cloud data points, for determining the structural orientation of the one or more obstacles.

8. The obstacle detection system as claimed in claim 6, wherein during detecting of one or more obstacles in the surrounding of the vehicle the ECU is configured to:
- map, each pixel within the boundary points of each of the one or more obstacles to the gradient formed for each point of the point cloud data points of the corresponding one or more obstacles, based on a distance error, to generate an enhanced point cloud data corresponding to the one or more obstacles;
- divide, the point cloud data of the surroundings into plurality of two Dimensional (2D) virtual grids, wherein each of the 2D virtual grid comprises a plurality of enhanced point cloud data points; and
- detect, one or more 2D virtual grids representing each of the one or more obstacles based on a height difference between at least two enhanced point cloud data points in each of the one or more 2D virtual grids, wherein the height difference exceeds a height threshold.

9. The obstacle detection system as claimed in claim 6, wherein the point cloud data of the surroundings comprises a plurality of 3-Dimensional (3D) data points defined by corresponding cartesian co-ordinates.

10. The obstacle detection system as claimed in claim 6, wherein the disparity image is generated from the one or more images comprising a first image and a second image, wherein generating of the disparity image comprises:
- matching each pixel in the first image to a corresponding pixel in the second image;
- computing a disparity value between each pixel in the first image to a corresponding pixel in the second image; and
- generating a disparity image based on the disparity value, wherein each pixel in the disparity image comprises the disparity value.

11. A non-transitory computer readable medium including instruction stored thereon that when processed by at least one processor cause an obstacle detection system to perform operation comprising:
- receiving one or more images of surroundings of the vehicle from an imaging unit and point cloud data of the surroundings of the vehicle from a Light Detection and Ranging (LIDAR) unit;
- generating a disparity image by analysing the one or more images;
- extracting one or more regions comprising one or more obstacles, from the disparity image;
- determining boundary points of each of the one or more obstacles, for determining a position of each of the one or more obstacles in terms of image co-ordinates in the disparity image;
- extracting point cloud data points from the point cloud data based on the image co-ordinates of the boundary points corresponding to the one or more obstacles; and
- determining a gradient for each of the extracted point cloud data points to determine a structural orientation of the one or more obstacles, thereby detecting the one or more obstacles.

12. The medium as claimed in claim 11, wherein determining the structural orientation of the one or more obstacles comprises:
- identifying one point from the point cloud data points;
- projecting a first virtual hemisphere and a second virtual hemisphere with the identified one point as a centre of the first virtual hemisphere and the second virtual hemisphere, wherein the first virtual hemisphere projects outwardly towards a top direction and the second virtual hemisphere projects outwardly towards a bottom direction of the identified one point, wherein the projection of the first virtual hemisphere and the second virtual hemisphere is performed until one of a radius of virtual hemispheres is equal to a first threshold value and number of point cloud data points present in the virtual hemisphere is equal to a second threshold value; and connecting the identified one point to each of the point cloud data points that lie within the first virtual hemisphere, for forming a gradient corresponding to each of the point cloud data points in the first virtual hemisphere;

connecting the identified one point to each of the point cloud data points that lie within the second virtual hemisphere, for forming a gradient corresponding to each of the point cloud data points in the second virtual hemisphere;

determining a resultant gradient in the first virtual hemisphere and the second virtual hemisphere based on the gradient corresponding to each of the point cloud data points in the first virtual hemisphere and the second virtual hemisphere, with respect to the identified one point; and accumulating the resultant gradient in the first virtual hemisphere and the second virtual hemisphere, of each of the point cloud data points, for determining the structural orientation of the one or more obstacles.

13. The medium as claimed in claim 11, wherein detecting each of the one or more obstacles comprises:

mapping each pixel within the boundary points of each of the one or more obstacles to the gradient formed for each point of the point cloud data points of the corresponding one or more obstacles, based on a distance error, to generate an enhanced point cloud data corresponding to the one or more obstacles;

dividing the point cloud data of the surroundings into plurality of two Dimensional (2D) virtual grids, wherein each of the 2D virtual grid comprises a plurality of enhanced point cloud data points; and detecting one or more 2D virtual grids representing each of the one or more obstacles based on a height difference between at least two enhanced point cloud data points in each of the one or more 2D virtual grids, wherein the height difference exceeds a height threshold.

14. The medium as claimed in claim 11, wherein the point cloud data of the surroundings comprises a plurality of 3-Dimensional (3D) data points defined by corresponding cartesian co-ordinates.

15. The medium as claimed in claim 11, wherein the disparity image is generated from the one or more images comprising a first image and a second image, wherein generating of the disparity image comprises:

matching each pixel in the first image to a corresponding pixel in the second image;

computing a disparity value between each pixel in the first image to a corresponding pixel in the second image; and generating a disparity image based on the disparity value, wherein each pixel in the disparity image comprises the disparity value.

* * * * *